United States Patent Office 3,652,466
Patented Mar. 28, 1972

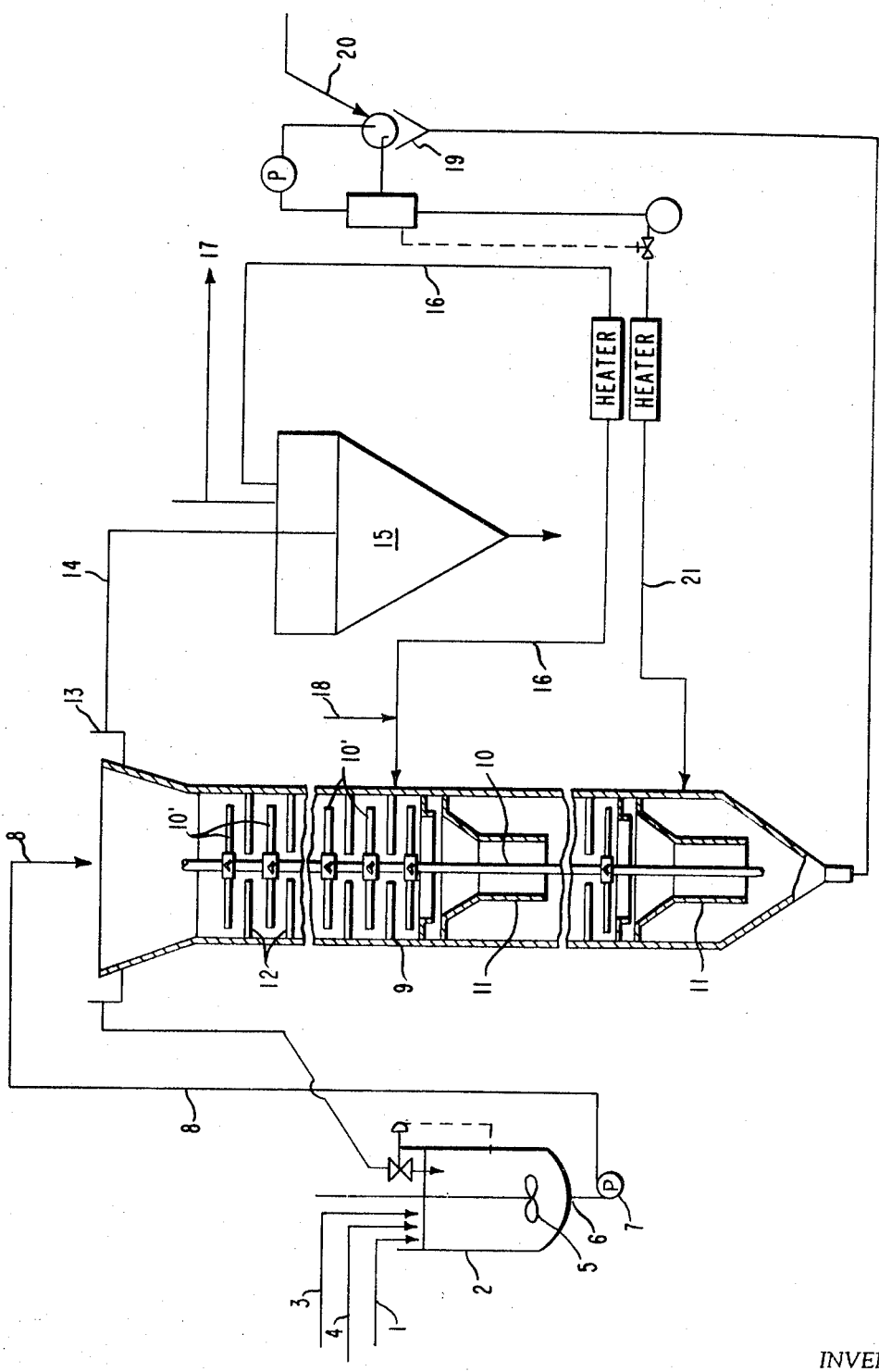
INVENTORS
ERWIN ROSS HITTEL
FOSTER WILSON RENNIE
ATTORNEY

3,652,466
PROCESS OF RECOVERING POLYESTER FROM POLYESTER FILMS HAVING POLYMERIC COATINGS
Erwin Ross Hittel, Brevard, N.C., and Foster Wilson Rennie, Wilmington, Del., assignors to E. I. du Pont de Nemours and Company, Wilmington, Del.
Filed July 16, 1968, Ser. No. 745,266
Int. Cl. C08g 53/22
U.S. Cl. 260—2.3
7 Claims

ABSTRACT OF THE DISCLOSURE

A process for the recovery of polyester base material from films, including photographic films, having at least one macromolecular organic polymer coating comprising (1) treating pieces or flakes of such films with a caustic alkali solution to form a slurry of flakes, (2) feeding the slurry into a classification column and allowing flakes to move downwardly to a rising column of aqueous liquid to separate the polyester material from the coating material, (3) removing flakes settling to the bottom of the column, and (4) recovering the polymeric coating material from the top of the column. The flakes are then dried and used as a source of polyester material.

BACKGROUND OF THE INVENTION

Field of the invention

This invention relates to the recovery of polyester base from scrap photographic film base or photographic film bearing polymeric coatings normally applied to the film during film manufacturing. More particularly, it relates to the recovery of polyester material bearing a hydrophobic organic copolymer substratum and a coating of a colloid-silver halide photographic emulsion. Still more particularly, this invention relates to a method for removing coatings, at least one of which is a vinylidene chloride copolymer layer, from polyethylene terephthalate film base and recovering the uncoated film base for use as a source of polyethylene terephthalate.

Description of the prior art

The prior art methods for recovering film base from scrap photographic film usually involve treating the scrap material with hot caustic alkali solutions at concentrations varying from 0.1 to 60% for prolonged periods of time (up to 4 hours). In many instances, the alkali treatment is followed by treatment with an acidified oxidizing agent such as permanganate. Often the film base is degraded in the attempt to recover starting materials or intermediate products from the original scrap material.

Scrap film has been treated directly, as received, and has also been comminuted to small sizes before treatment.

Another method used to render scrap film reusable is by mechanical treatment, including abrading or scraping away the light-sensitive and other layers on the film, followed by chemical treatment of the film.

Methods for removing coatings from film base with caustic liquor are disclosed in Bratring U.S. Pat. 2,850,-411 for celluloid film base, Cohen British Pat. 870,839 for polymethylene terephthalate film, Slack U.S. Pat. 2,338,673 for cellulose nitrate sheeting, and in Reid U.S. Pat. 2,099,348 for comminuted cellulose acetate film.

Wemple U.S. Pat. 3,047,435 saponifies polyethylene terephthalate base to terephthalic acid with alkali and oxidizing agent. The terephthalic acid is then used to prepare polyethylene terephthalate base.

Fox U.S. Pat. 2,688,614 removes subbing layers from sheeting of cellulose acetate derivatives by treatment of comminuted scrap material with caustic liquid and alkali metal permanganate.

The classification technique of separating specific solids from solution has been applied to the recovery of precious metals from their solutions. See Sulman U.S.A. Pat. 587,408, Aug. 3, 1897.

The major shortcoming of the prior art methods of recovering scrap film base is one of economics. Almost all of the methods are costly, involving time-consuming operations that require many manhours of labor. In many instances, the scrap must be subjected to a number of separate treatments to remove the coatings, and more often than not, the recovered product, even after the coatings have been removed, must undergo further treatment before it is in a reusable form.

At the high alkali concentrations and high temperatures often employed in the prior art methods, there is always the possibility of causing destructive saponification of the film surface if conditions are not carefully controlled.

Those methods that treat stock as it is received, without reducing it in size, can treat only limited amounts of material at a given time and require more extreme reaction conditions, which further decreases the economy.

In the present method, the scrap is continuously fed into the recovery system and treated in a fully automated manner. A further advantage of the present method is that it uses inexpensive apparatus and materials. Yet another adavntage is that the final product leaves the system in a form that is immediately reusable. There is no dissolution of the film base and degradation back to the starting materials. The final product may go directly back into the polymerization mixture.

SUMMARY OF THE INVENTION

A process for the recovery of polyester base material from polyester films having at least one coating of a macromolecular organic polymer which comprises:

(1) Treating the coated films in the form of pieces of film of small area with a caustic aqueous alkali solution to form a slurry of the pieces;

(2) Feeding the slurry into a classification column and allowing the pieces to move downwardly and countercurrent to a rising, slowly moving column of aqueous liquid to separate the pieces from the coating material;

(3) Removing the pieces in suspension in liquid from the bottom portion of the column, and (4) Removing the coating material from a top portion of the column.

The recovered pieces can be used as a source of polyester material and used to make films, filaments, or other shaped articles. Similarly, any silver halide in the coating material can be recovered in the form of silver or in other manners.

An object of this invention is to provide a simple, effective, and economical process for removing resin-subbed coatings from scrap polyester film base. Another object is to provide such a process which removes the coatings to give undegraded, pure polyester film base in a form suitable for reuse. Other objects will become apparent hereinafter.

DESCRIPTION OF THE PREFERRED EMBODIMENTS

In the manufacture of polyethylene terephthalate film base, the film is usually coated with one or more layers of anchoring substratum, such as vinylidene chloride copolymer layer, to improve the adhesion of the light-sensitive emulsion to the base. In preparing this film base, such as by the procedures of Alles et al. U.S. 2,627,088 and Alles U.S. 2,779,684, a good deal of waste or scrap material bearing vinylidene chloride copolymer and gelatin coatings, as well as coatings of silver halide emulsion, antistatic layers, antiabrasion layers and antihalation layers, is acquired. While the emulsion layers can be readily removed, for example, by treatment with hot water or enzyme digestion, the subsequent removal of the substratum presents a much more difficult problem.

The process of the invention is illustrated in the attached drawing, which is schematic in nature, and shows a suitable column in elevation.

In accordance with this invention and referring to the drawing, small pieces or chips of scrap polyester film base in the form of squares having sides ¼ to ¾ inch are fed continuously through conduit 1 to a treatment vessel 2 that is provided with conduit means 3 for feeding an aqueous solution containing a surfactant into the vessel and conduit means 4 for feeding hot caustic liquid, such as sodium or potassium hydroxide, into the vessel. The vessel is provided with an agitator 5 and has an outlet 6 at the bottom for withdrawing a slurry of the caustic material and the pieces and any removed coating material. The pieces are maintained in the tank for a period sufficient to dissolve the coatings, e.g., gelatin, and to release the silver compounds from any photographic emulsion coating. The slurry is forced by pump 7 and conduit 8 to the top of classification column 9.

The classification column comprises a cylindrical casing, which, in a practical size, can be 3–4 ft. in diameter and about 27 ft. in length. It is provided with a centrally disposed agitator 10 mounted in suitable bearings, not shown. Conduit 8 having a diameter about one-fourth or less that of the column allows for non-turbulent flow of the slurry into the column. Funnel-shaped members 11 having a lower diameter about one-third that of the column are provided in the column. They aid in controlling the flow of liquid and the countercurrent movement of the pieces through the column.

Metal agitator blades 10′, about 1½ in. by ½ in., attached to the shaft and extending to within a few inches of the wall of the column, are spaced along the shaft column. The agitator blades are set about one-foot apart. Between each two sets of agitator blades there are disposed metal baffle vanes 12, about 2 in. by ⅜ in. in size. They are attached to and extend from the wall of the column to within a few inches of the shaft. Overflow liquid containing the elutriated coatings that were removed from the polyester base leaves the top of the column through the overflow launder 13 and through conduit 14 into settling tank 15.

The agitator and baffle elements prevent bridging of the pieces in the column, keeping the pieces from packing and preventing flow; and they help to loosen the coatings from the polyester base. The blades are adapted to rotate very slowly and do not force the movement of the flakes through the column, allowing the polyester base pieces to settle slowly to the bottom of the column, freed from its coatings, by the differences in the settling rates of the coatings and base.

The column serves several purposes:

(1) The major portion of any silver halide material entering the column is separated from the polyester pieces or flakes which settle in the column.

(2) The flakes are contacted with a countercurrent flow of liquid which serves to elutriate the polymer skins, silver solids, and whatever other coating materials may be present.

(3) Slight agitation in the column enhances the separation of coatings from the polyester flakes.

(4) As the flakes pass from one section to another, they are washed by the upward flow of water in the column.

The slurry of coated polyester flakes entering the column moves counter to a current of water which is recycled from the bottom of the column after the polyester flakes have been filtered off. The flakes descend in the column where the upward moving liquid separates the polyester chips from the coatings. The flakes settle in the column and the coating components, having a slower settling rate, overflow from the column, passing to the settling tank where the major portion of the silver compounds are removed by sedimentation. Part of the liquor is reheated and returned to the column through conduit 16 as elutriation liquid in the upper portion of the column. The remainder of the liquor passes to waste treatment facilities 17 to recover silver, neutralize caustic, and remove gelatin. An alternate feed of caustic liquor is fed into the column through conduit 18 to replace the caustic removed as waste.

Flakes settling in the bottom of the column pass to a filter 19 for removal of water. After the flakes have been filtered from the solution, make up water is added to the main flow of water through conduit 20 to replace the water removed as waste, and the combined make up and filtrate water are reheated to about 100° C. at atmospheric pressure and returned to the bottom of the column through conduit 21. This returned liquor washes the flakes as the water passes upward through the column. The upward flow rate can be 0.5 to 1.5 ft./min.

The filtered flakes after being washed free of caustic with water may be dried and stored or melted for reuse.

The feed tank that initially receives the flakes, caustic and surfactant serves to dissolve the gelatin and to wet and disperse the flakes before entry to the column. A few minutes (about 5 min.) are sufficient to dissolve the gelatin.

The classification phenomenon of the wash column depends not on the weight of the materials, but on the settling rate of the components. The settling rate of the polyester base is greater than that of the organic components of the coatings.

The wash solution is composed of a dilute aqueous solution of an alkali metal hydroxide (2.5–5% by weight) and an anionic, cationic, or non-ionic surfactant stable to alkali. The metal hydroxide solution removes the coatings from the base. The surfactant aids in loosening the anchorage and removing the silver from the emulsion coating.

In a preferred embodiment of this invention, the washing solution consists of 3%–5% by weight aqueous sodium hydroxide and an aqueous solution of 0.5% by weight of sodium dodecyl sulfate or other surfactant. The slurry is reacted in the column for 45 minutes, after which time the settled polyester flakes are removed from the column, filtered, dried and fed directly into a polymer melting vessel for reuse as film base.

The separation of base from coatings has a variable time period of from 15 min. to 2 hours depending on the type of coatings, their hardness and thickness, the concentration of the wash solution, the rate of liquid flow up the column, and the desired purity of the film base.

Drying of the polyester flakes can be carried out in air at room temperature, or in heated air or by infrared radiation as is customary in the art.

The polyester film base can have on at least one surface a layer of a vinylidene chloride copolymer containing at least 35% by weight of vinylidene chloride and especially a tricomponent copolymer of (1) vinylidene chloride, (2) an acrylic acid or methacrylic acid ester, and (3) itaconic acid.

The vinylidene chloride copolymer coatings are not limited to those of the examples. Other suitable copolymers are disclosed in assignee's Canadian Pat. 626,996. Methods of preparing these copolymers are described in U.S. Pats. 2,160,903 and 2,160,931 to 2,160,943, inclusive, 2,160,945, 2,160,946 and 2,160,947.

The invention is not limited to the recovery of polyethylene terephthalate from manufacturing scrap, but is useful with exposed and developed photographic film and with vinylidene chloride copolymer coated polyester films having other layers than water-permeable colloid silver halide layers.

The invention is useful for recovery of base from engineering reproduction and drafting films having a polyester base and layers containing matte or toothing agents, e.g., in gelatin, resins or polymers and with magnetic recording tapes, discs, etc., containing ferromagnetic particles in gelatin, polyvinyl alcohol, polyesterurethanes or other polymeric binders on a polyester base.

The invention is useful with X-ray film, cine film, lithographic film, portrait film, microfilm, and multicolor film of various types.

The following examples illustrate the invention:

EXAMPLE I

About 1500 lbs. of polyethylene terephthalate film having the composition 74.00% polyester base, 1.03% resin, 11.75% silver halide, and 13.22% gelatin which had been prepared as disclosed in U.S. Pat. 2,465,319 and coated as described in U.S. Pat. 2,627,088 with a copolymer prepared from 85 parts vinylidene chloride, 15 parts methyl acrylate, and 2 parts itaconic acid, was reduced to small flakes about ¼-inch square. The flakes were treated in the apparatus shown in the drawing.

Thus, the flakes were slurried in a tank with a 3% (weight/weight) solution of sodium hydroxide and a 0.5% aqueous solution of sodium dodecyl sulfate. The slurry was fed into a classification wash column where the flakes moved countercurrent to water heated to 100° C., the water flowing upward at about one foot per minute, separating the emulsion coating and subbing layer from the film base and washing the polyester flakes. After a 45-min. treatment in the wash column, the polyester material was removed and filtered from the aqueous solution and washed with water. The flakes were dried at room temperature.

The polyethylene terephthalate recovered was in a form pure enough to be reused immediately in preparing film base by adding portions of it to molten polyethylene terephthalate prepared in the usual manner for extrusion into a film. Alternatively, the flakes themselves can be melted alone and extruded into film or fibers.

EXAMPLE II

A quantity of polyethylene terephthalate film scrap made after the manner disclosed in U.S. Pat. 2,465,319 and coated as described in U.S. Pat. 2,627,088 with a copolymer prepared from 90 parts vinylidene chloride, 10 parts acrylonitrile, and one part itaconic acid, was reduced to flakes about ¼-inch square and treated with a 3% solution of sodium hydroxide and 0.5% sodium dodecyl sulfate and further treated in the aparatus as described in Example I. The anchorage of the resinous copolymer coating to its support was destroyed, leaving, after a 1-hr. treatment, after filtration, washing with water and drying, clean polyethylene terephthalate flakes.

The process of this invention has a number of advantages in economy of operation over other methods of scrap film recovery. The invention consists of a fully automated process for recovery of scrap film. The materials and apparatus required are simple and economical. Large amounts of scrap film can be fed continuously into the system to be treated. The silver and silver salts from the emulsion coatings are recovered completely. The film is recovered in a form that does not require further treatment before reuse.

The process is useful in recovering polyester material from any of the polyester coated films described in the Alles et al. and Alles patents described above, coated films made from related polyesters and polycarbonates, and the drafting films of Van Stappen U.S.P. 3,227,576, Jan. 4, 1966.

The embodiments of the invention in which an exclusive property or privilege is claimed are defined as follows:

1. A process for the recovery of polyester base material from photographic polyester films having at least one coating of macromolecular organic polymer which comprises:
   (1) feeding small pieces of the coated films into a classification column and allowing the pieces to move downwardly and countercurrent to a rising, slowly moving column of aqueous solution;
   (2) injecting caustic liquid into said column to produce a caustic aqueous alkali solution in the upper portion of the column;
   (3) chemically separating said pieces of film from the coating material as said pieces descend from the upper portion of said column;
   (4) mechanically classifying said pieces of film having a settling rate greater than the settling rate of said coating material;
   (5) removing the pieces of film in suspension in liquid from the bottom of the column; and
   (6) removing the coating material from a top portion of the column.

2. A process according to claim 1, wherein the alkali solution is aqueous NaOH of about 3% to about 5% concentration.

3. A process according to claim 1, wherein the polyester is polyethylene terephthalate.

4. A process according to claim 1, wherein a coating is a vinylidene chloride addition copolymer containing at least 35% by weight of vinylidene chloride.

5. A process according to claim 1, wherein a coating is a vinylidene chloride addition copolymer containing at least 35% by weight of vinylidene chloride, and the coating bears a water-permeable colloid silver halide emulsion layer.

6. A process according to claim 5, wherein the colloid is gelatin.

7. A process according to claim 1, wherein the pieces of film are first treated with a caustic aqueous alkali solution to form a slurry containing small pieces of said coated film, and said slurry is fed into the classification column.

References Cited

UNITED STATES PATENTS

| | | | |
|---|---|---|---|
| 1,984,431 | 12/1934 | Robertson | 209—159 |
| 2,286,979 | 6/1942 | Samuel | 209—159 |
| 2,533,655 | 12/1950 | Wilmot | 209—159 |
| 3,503,904 | 3/1970 | Dietz et al. | 260—2.3 |
| 3,351,195 | 11/1967 | Hukki | 209—158 |
| 3,415,373 | 12/1968 | Pink et al. | 209—159 |

FOREIGN PATENTS

| | | | |
|---|---|---|---|
| 870,639 | 6/1961 | Great Britain | 260—2.3 |

JOHN C. BLEUTGE, Primary Examiner

U.S. Cl. X.R.

117—63; 209—158, 159